(12) United States Patent
Zona

(10) Patent No.: US 10,967,922 B2
(45) Date of Patent: Apr. 6, 2021

(54) VEHICLE

(71) Applicant: Zona Engineering & Design S.a.s. di Zona Mauro & C., Turin (IT)

(72) Inventor: Mauro Zona, Turin (IT)

(73) Assignee: ZONA ENGINEERING & DESIGN S.A.S. DI ZONA MAURO & C., Turin (IT)

( * ) Notice: Subject to any disclaimer, the term of this patent is extended or adjusted under 35 U.S.C. 154(b) by 0 days.

(21) Appl. No.: 16/087,889

(22) PCT Filed: Mar. 21, 2018

(86) PCT No.: PCT/IB2018/051896
§ 371 (c)(1),
(2) Date: Sep. 24, 2018

(87) PCT Pub. No.: WO2018/172953
PCT Pub. Date: Sep. 27, 2018

(65) Prior Publication Data
US 2020/0010131 A1      Jan. 9, 2020

(30) Foreign Application Priority Data

Mar. 24, 2017   (IT) ......................... 102017000032614

(51) Int. Cl.
*B62D 55/065*     (2006.01)
*B62D 55/084*     (2006.01)
(Continued)

(52) U.S. Cl.
CPC ......... *B62D 55/065* (2013.01); *B62D 55/084* (2013.01); *B25J 11/002* (2013.01);
(Continued)

(58) Field of Classification Search
CPC .. B62D 55/065; B62D 55/084; B62D 55/116; B60G 17/033; B60G 3/12; B60G 3/14; B60G 3/145; B60G 7/006; B60G 17/0157
(Continued)

(56) References Cited

U.S. PATENT DOCUMENTS 3,417,832  A      12/1968  Ziccardi
3,924,704  A  *  12/1975  Lindblom ........ B60G 17/01925
                                                                180/41
(Continued)

FOREIGN PATENT DOCUMENTS

CA         2899780 A1 *  8/2014  ........... B62D 55/084
WO    WO-2016129139 A1 *  8/2016  ........... B62D 55/065

OTHER PUBLICATIONS

International Search Report and Written Opinion of the International Searching Authority for PCT/IB2018/051896 dated Jun. 13, 2018.

*Primary Examiner* — Anne Marie M Boehler
(74) *Attorney, Agent, or Firm* — Heslin Rothenberg Farley & Mesiti P.C.; Victor A. Cardona, Esq.

(57) ABSTRACT

An all-terrain vehicle for civil protection activities includes a vehicle structure with at least one module for transporting persons and/or material, and a plurality of legs bearing respective wheel assemblies or track assemblies. Each leg is pivotably mounted about a first transverse axis. One first end of the leg carries a wheel assembly or a track assembly and a second end is freely mounted pivoting about the first transverse axis on a first support which is carried by the vehicle structure. An electronically-controlled actuator adjusts an angular position of the first support about a first transverse axis. Between the first support and the leg structure two spring-shock absorber assemblies are interposed, which extend along the leg.

13 Claims, 14 Drawing Sheets

Figure 1:
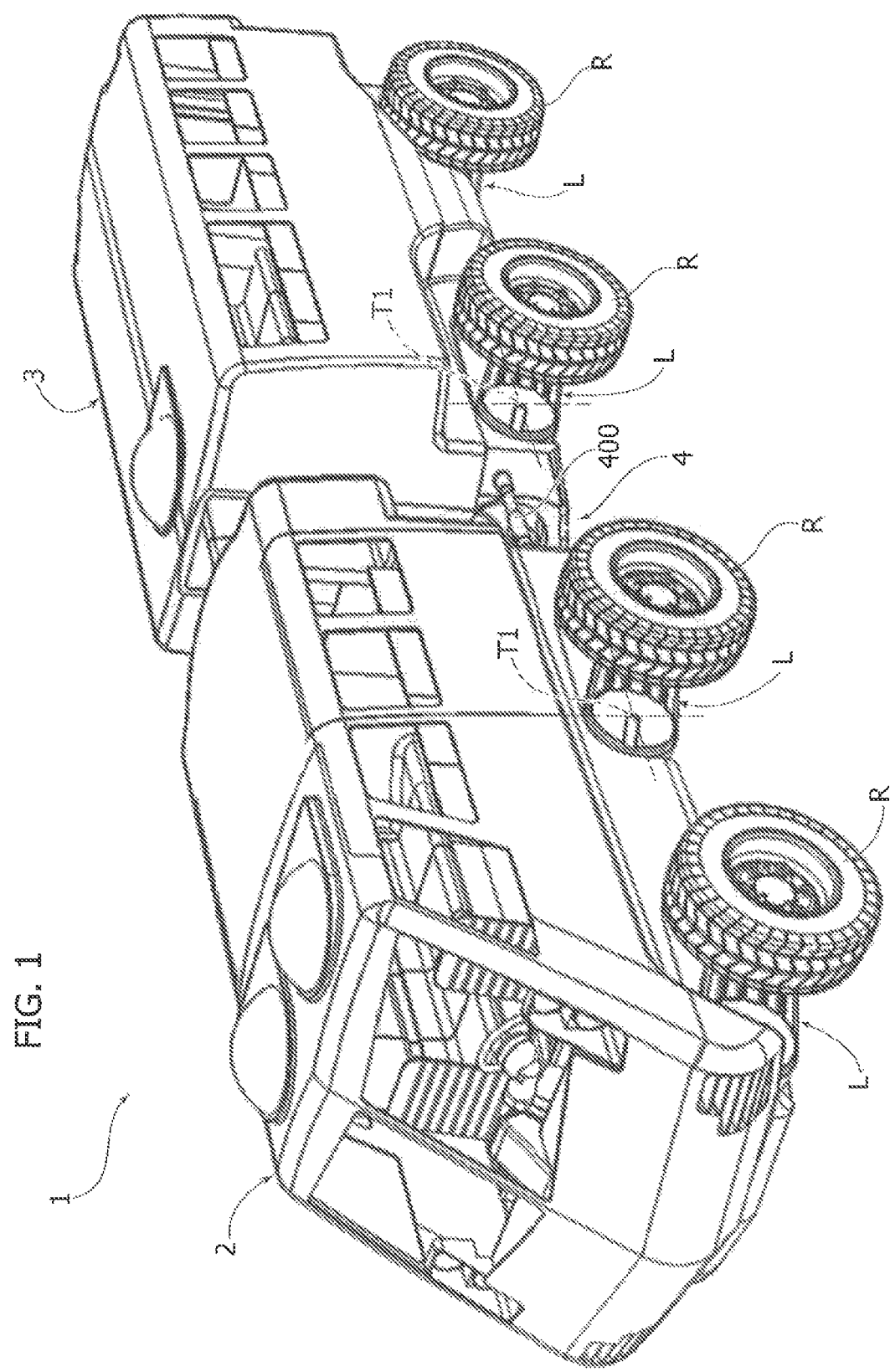

(51) Int. Cl.
   *B62D 55/116* (2006.01)
   *B60G 3/14* (2006.01)
   B25J 11/00 (2006.01)
   B60G 17/033 (2006.01)
   F02B 75/32 (2006.01)
(52) U.S. Cl.
   CPC .......... *B60G 17/033* (2013.01); *B62D 55/116* (2013.01); *F02B 75/32* (2013.01)
(58) Field of Classification Search
   USPC .............. 180/9.4, 9.5, 9.52, 9.54; 280/5.514, 280/6.155, 6.156
   See application file for complete search history.

(56) References Cited

U.S. PATENT DOCUMENTS

| | | | |
|---|---|---|---|
| 7,475,745 | B1 | 1/2009 | DeRoos |
| 2004/0216932 | A1* | 11/2004 | Giovanetti .............. F41H 7/005 180/9.1 |
| 2004/0231904 | A1* | 11/2004 | Beck ........................ B64B 1/50 180/197 |
| 2005/0145428 | A1 | 7/2005 | Chun et al. |
| 2016/0107709 | A1* | 4/2016 | Hellholm ............. A01G 23/003 180/9.4 |
| 2019/0241037 | A1* | 8/2019 | Hays ...................... B60G 17/04 |

* cited by examiner

VEHICLE

CROSS REFERENCE TO RELATED APPLICATIONS

This application is a 371 national stage of PCT International Application No. PCT/IB2018/051896, filed on Mar. 21, 2018, which claims priority to Italian Patent Application No. 102017000032614 filed on Mar. 24, 2017, the entire disclosures of which are incorporated herein by reference.

FIELD OF THE INVENTION

The present invention relates to a vehicle configurable—in particular—as a high mobility ATV ("All-Terrain Vehicle"), usable for example in civil emergency and rescue activities, or in the agricultural field, or in earth-moving activities or the like. However, the possibility of applying some fundamental disclosures of the present invention to vehicles of other types, including cars, is not excluded.

The invention relates in particular to a vehicle of the type comprising:
- a vehicle structure, comprising at least one module for transporting persons and/or material,
- a plurality of legs articulated to the vehicle structure and bearing respective wheel assemblies or track assemblies,
- wherein each leg of the vehicle is pivotably mounted with respect to the vehicle structure at least about a first transverse axis.

PRIOR ART

Various types of vehicles of the type indicated above have been proposed in the past. None of the vehicles proposed up to now, however, can effectively solve the problem of an intervention in areas that are extremely difficult to reach, for example, in the case of emergency situations following natural disasters such as earthquakes, landslides and floods.

OBJECT OF THE INVENTION

The object of the present invention consists in producing a vehicle of the abovementioned type in which each articulated leg performs both a function of controlling the attitude of the vehicle, and a function of suspension of the structure of the vehicle and, if necessary, a support function for a motorization system of the relative wheel assembly or track assembly.

A further object is to provide a vehicle of the abovementioned type that is able to deal with terrains having a maximum degree of difficulty, but also has an extremely simple and functional structure, easily adaptable to be set up either with wheels or, alternatively, with tracks.

An additional and important object of the invention is that of producing a vehicle of the type indicated above, which is equipped with an improved system for controlling the attitude of the vehicle during advancement on rough terrains, and which allows the maximum degree of comfort for the occupants.

An additional object of the invention is to propose a vehicle configurable with a front module and a rear module, reciprocally articulated, and equipped with an improved articulated joint for connecting the two modules of the vehicle, which allows passage through the joint of a transmission line of the motion from an engine associated with the front module of the vehicle to the wheels or tracks associated with the rear module.

SUMMARY OF THE INVENTION

These and additional objects and advantages of the invention are achieved mainly by virtue of the characteristics indicated in the attached claim 1, and preferably also by means of the further characteristics that are indicated in the attached dependent claims.

DETAILED DESCRIPTION OF SOME PREFERRED EMBODIMENTS

Figure 2:
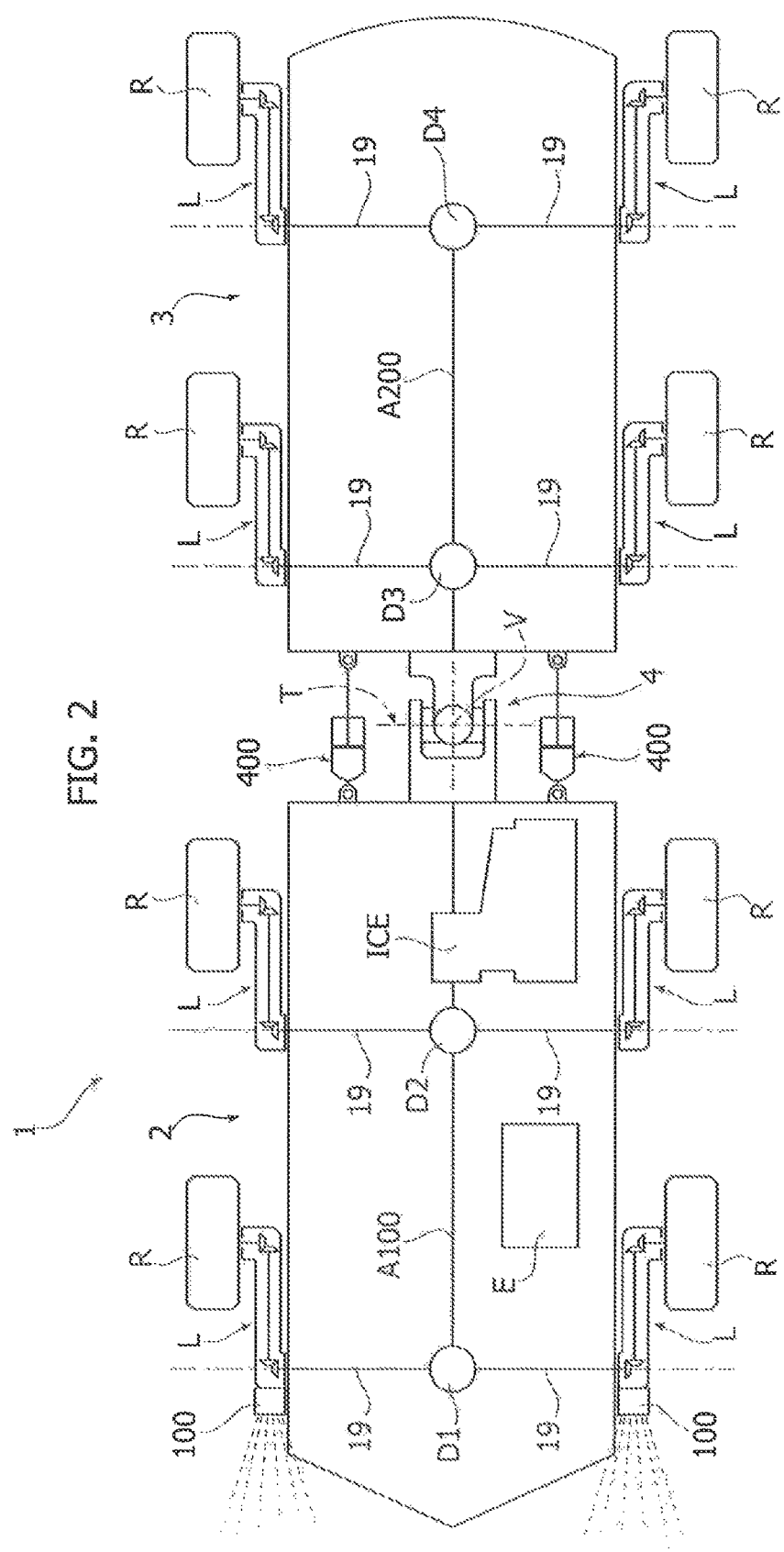
Figure 2A:
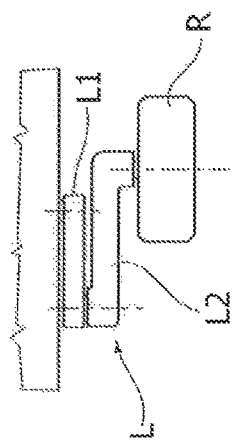
Figure 3:
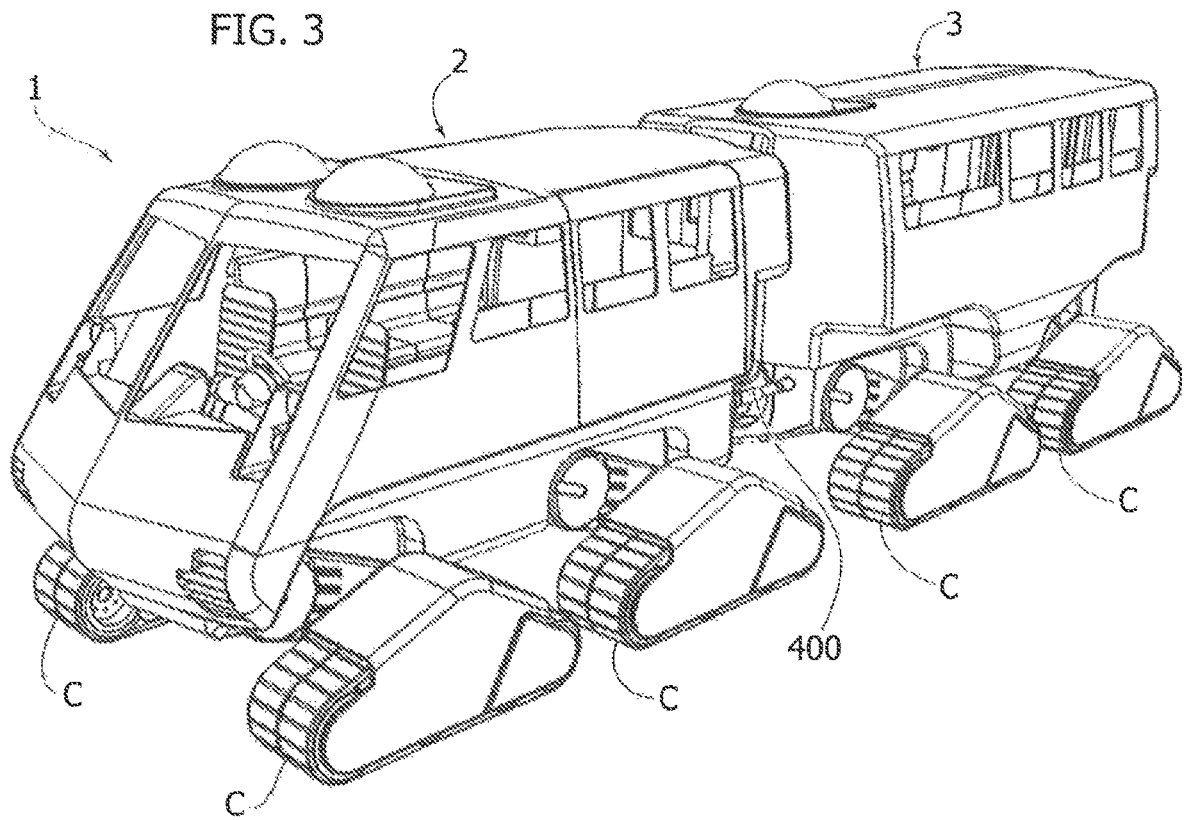
Figure 4:
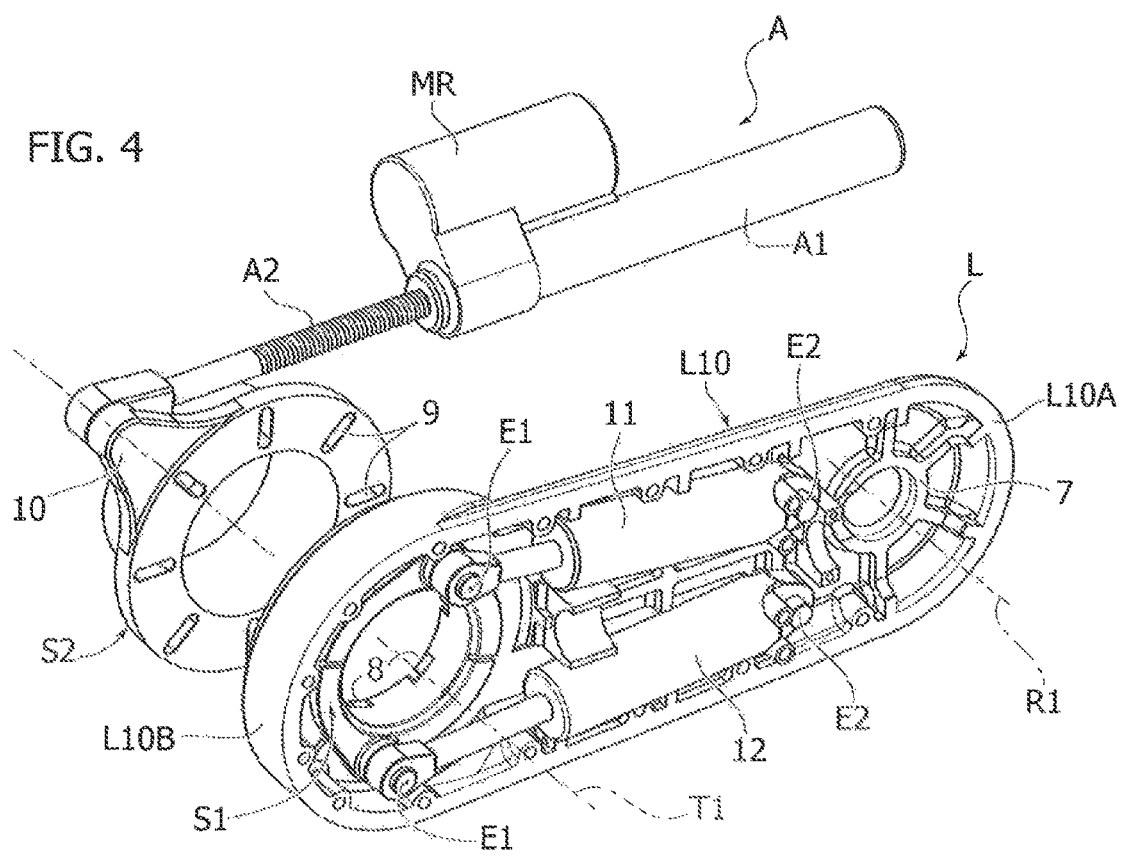
Figure 5:
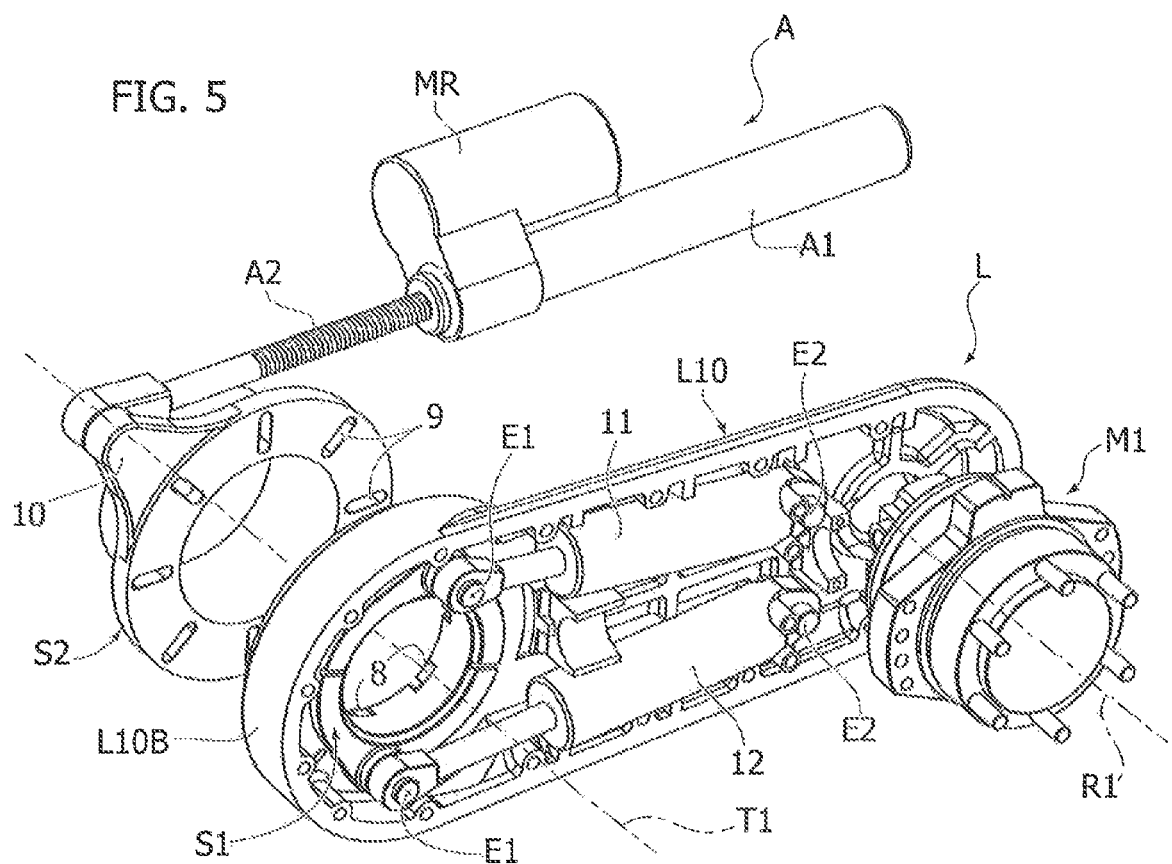
Figure 6:
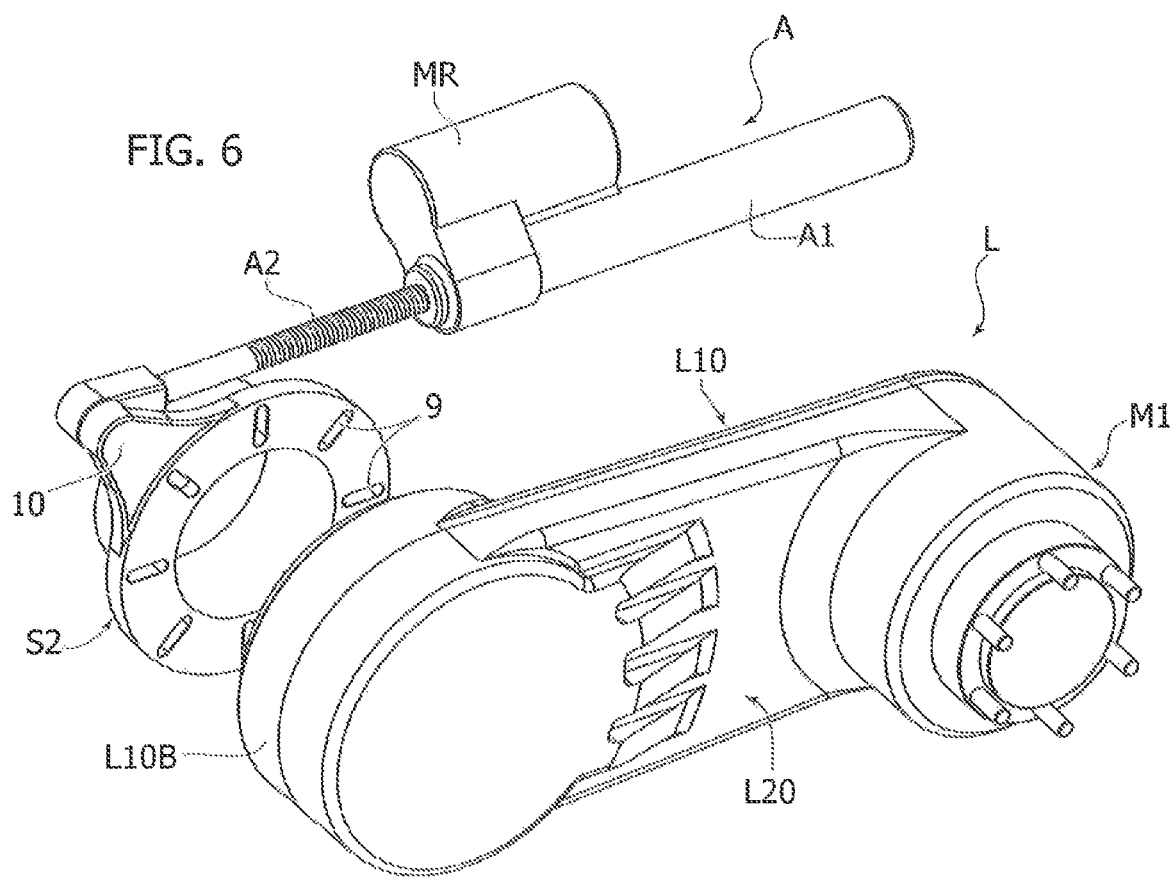
Figure 7:
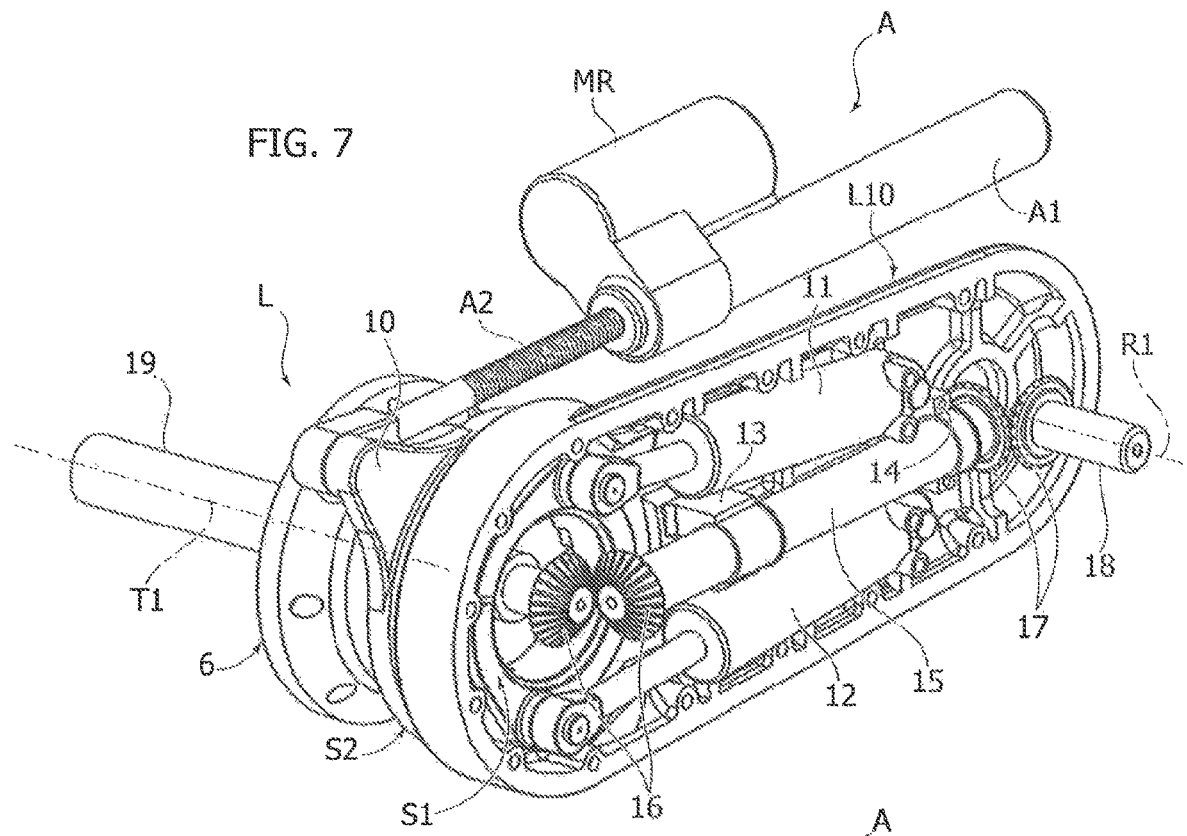
Figure 7A:
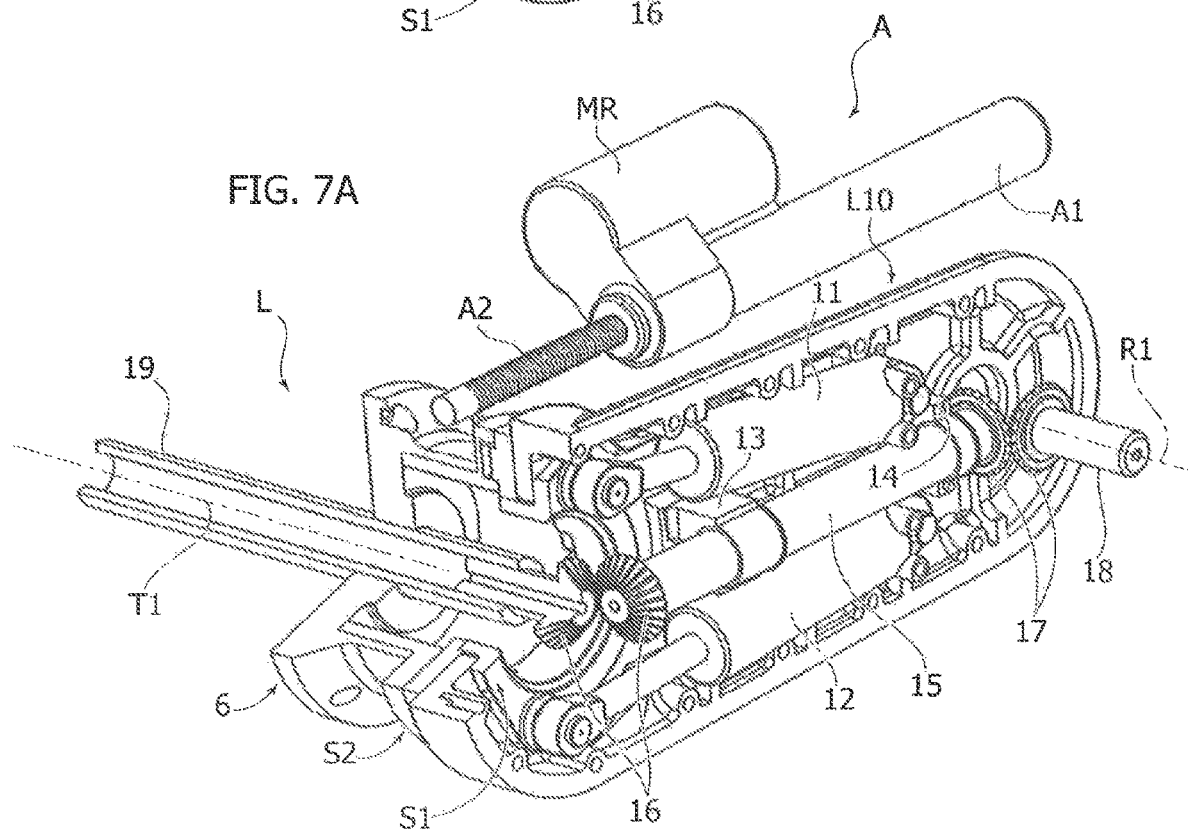
Figure 8:
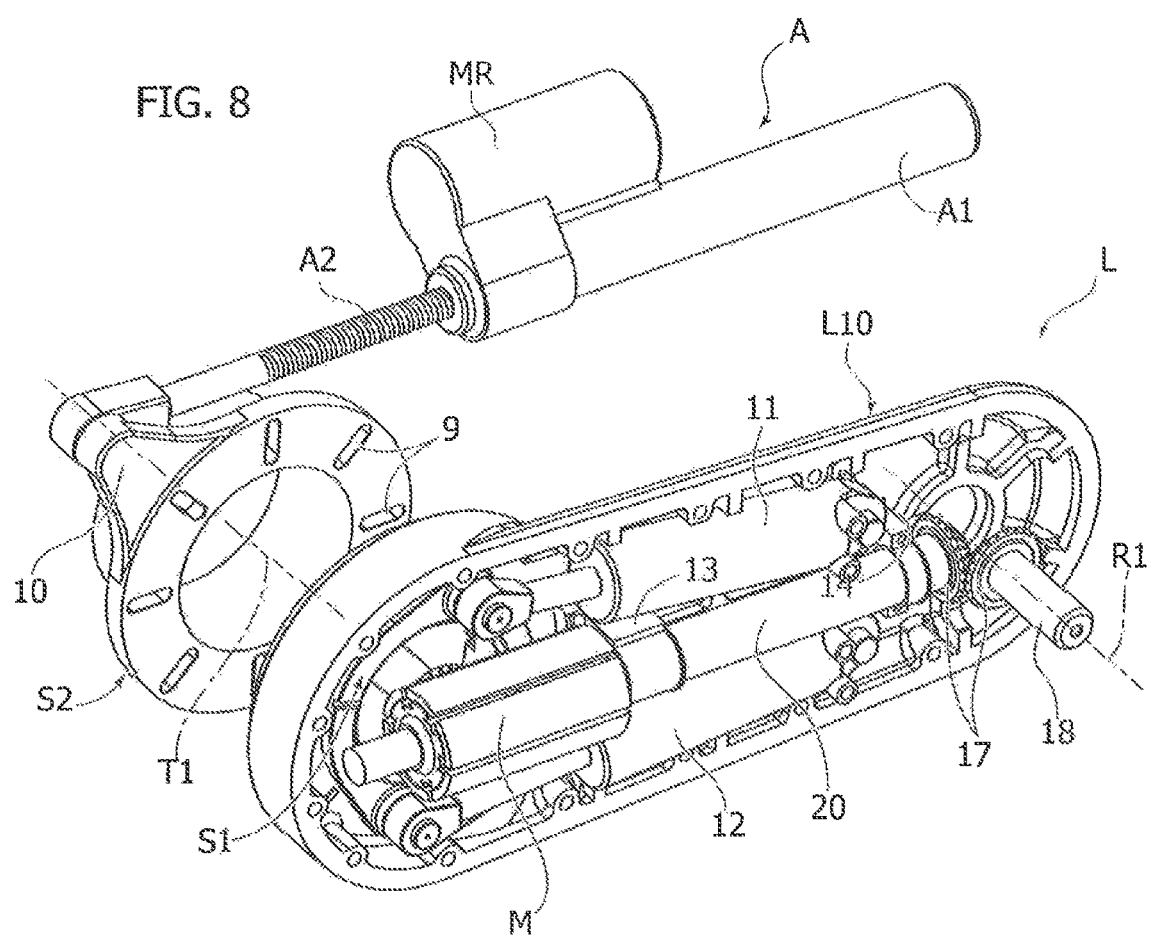
Figure 9:
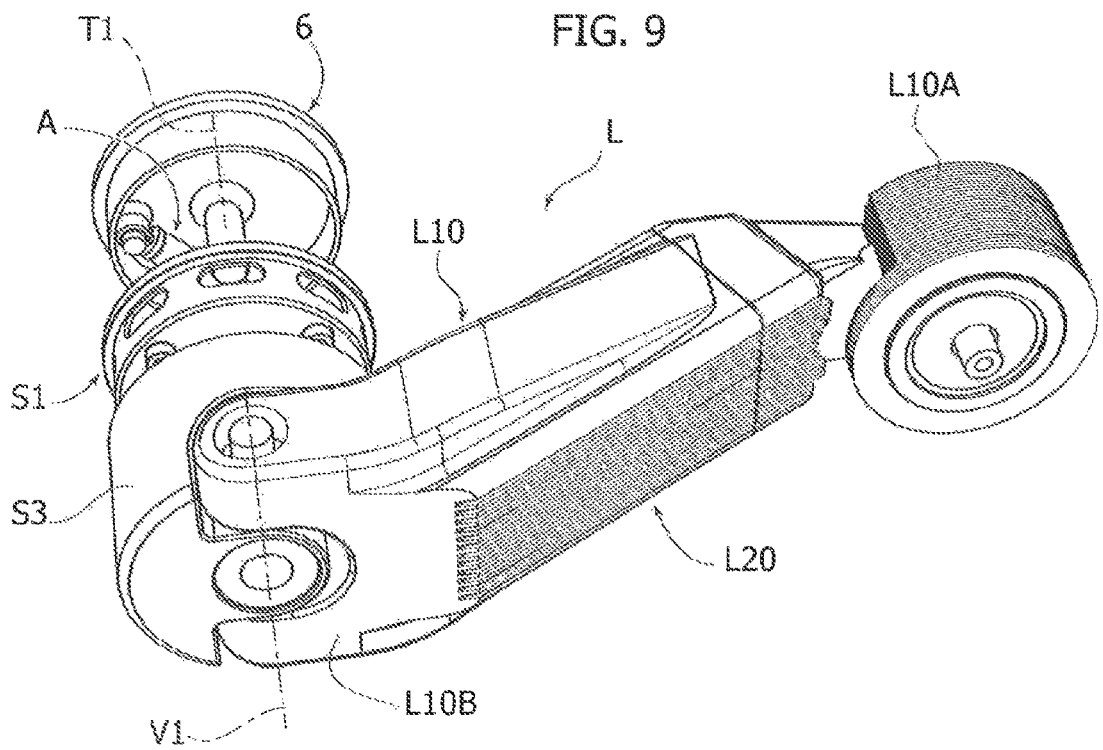
Figure 10:
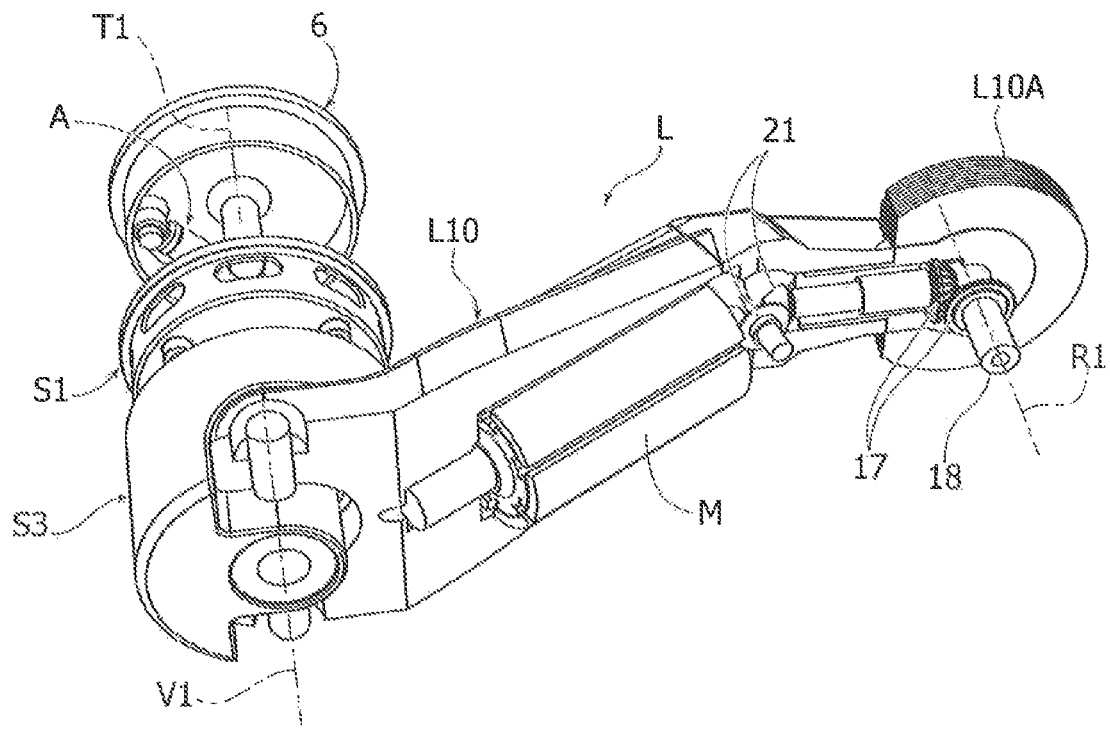
Figure 11:
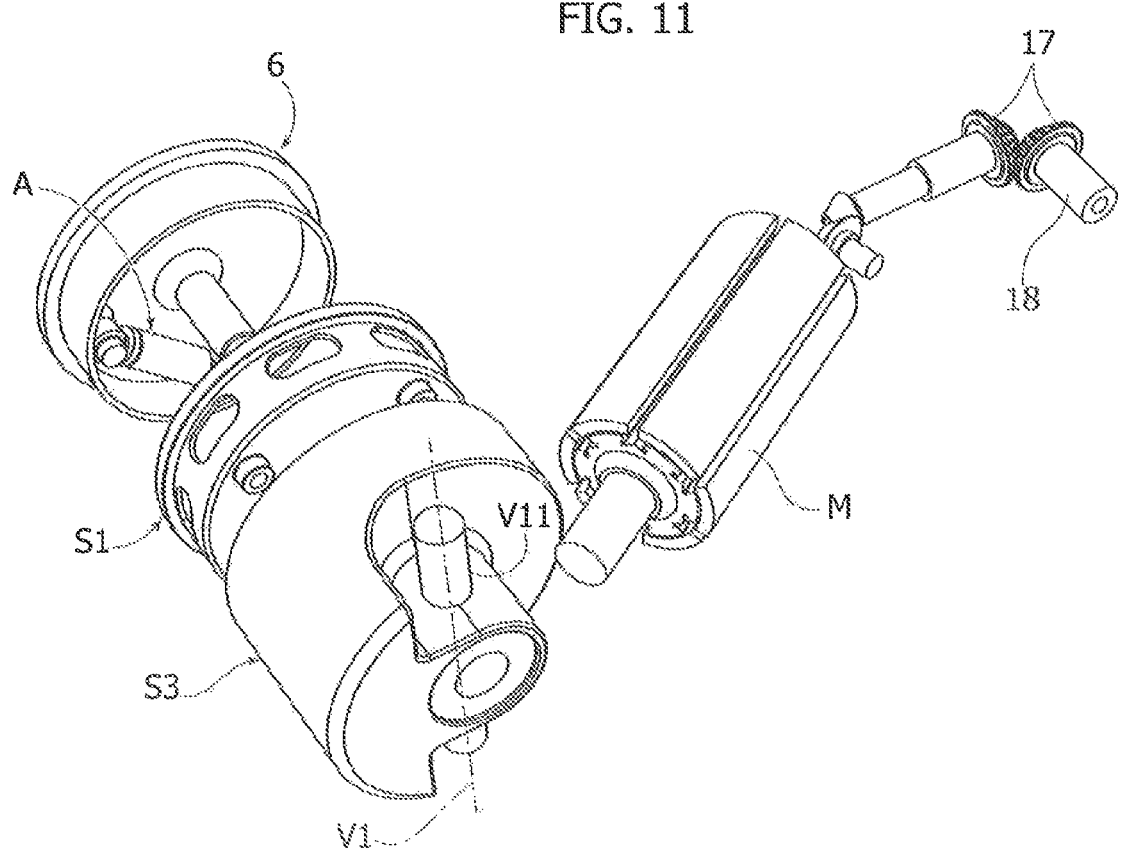
Figure 12:
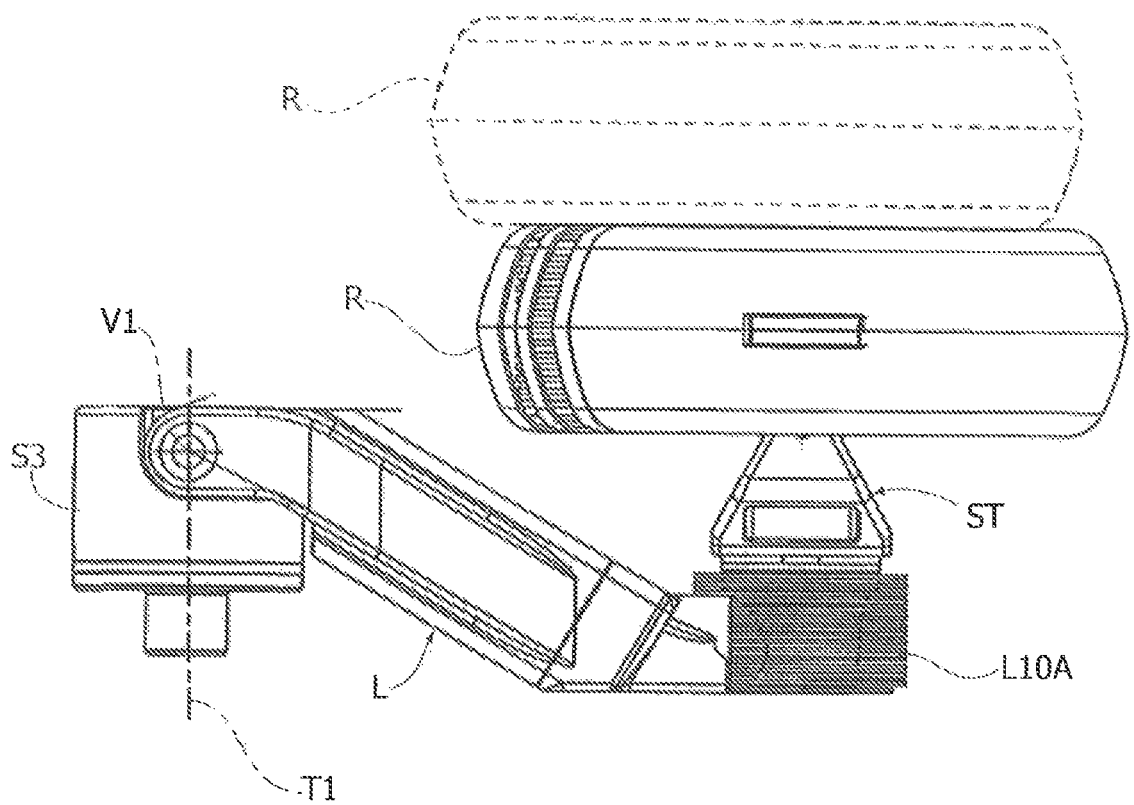
Figure 13:
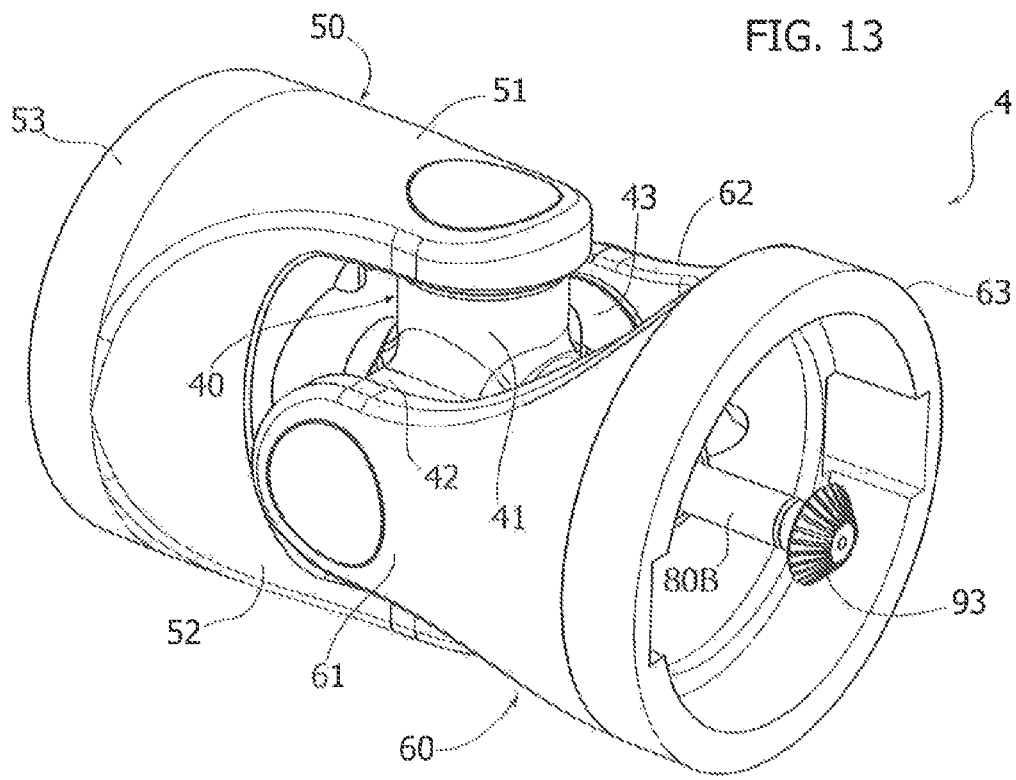
Figure 15:
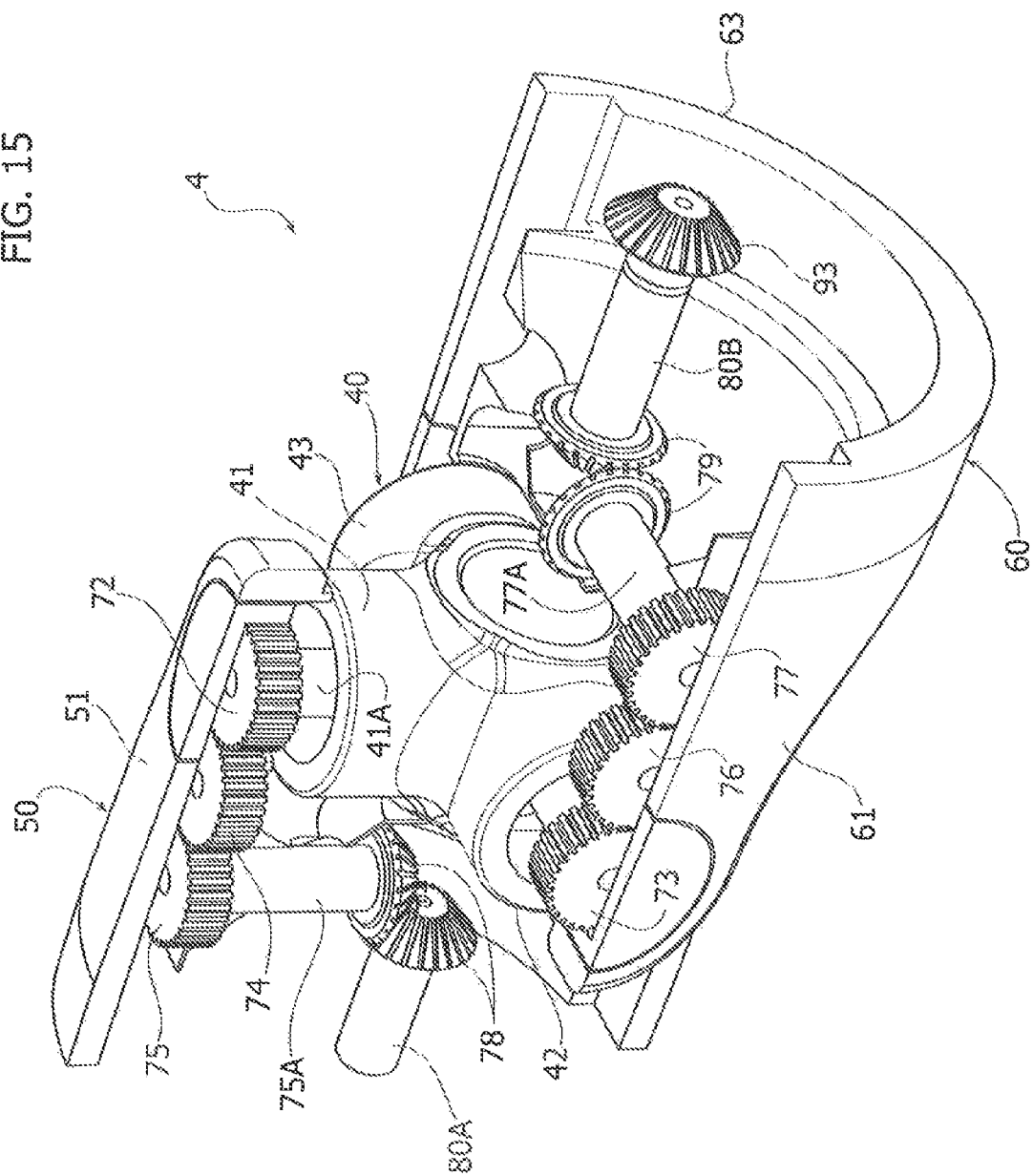
Figure 16:
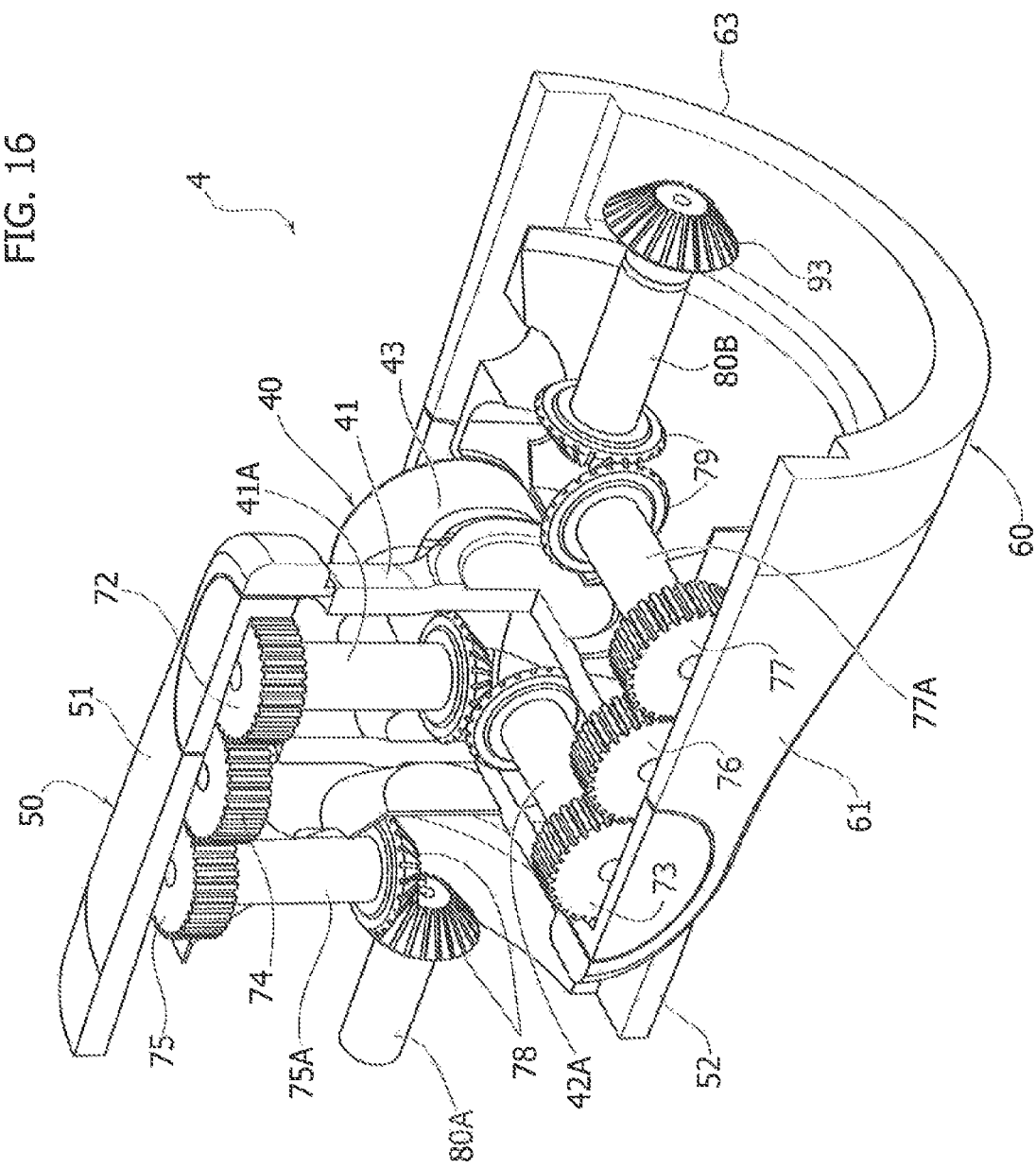
Figure 17:
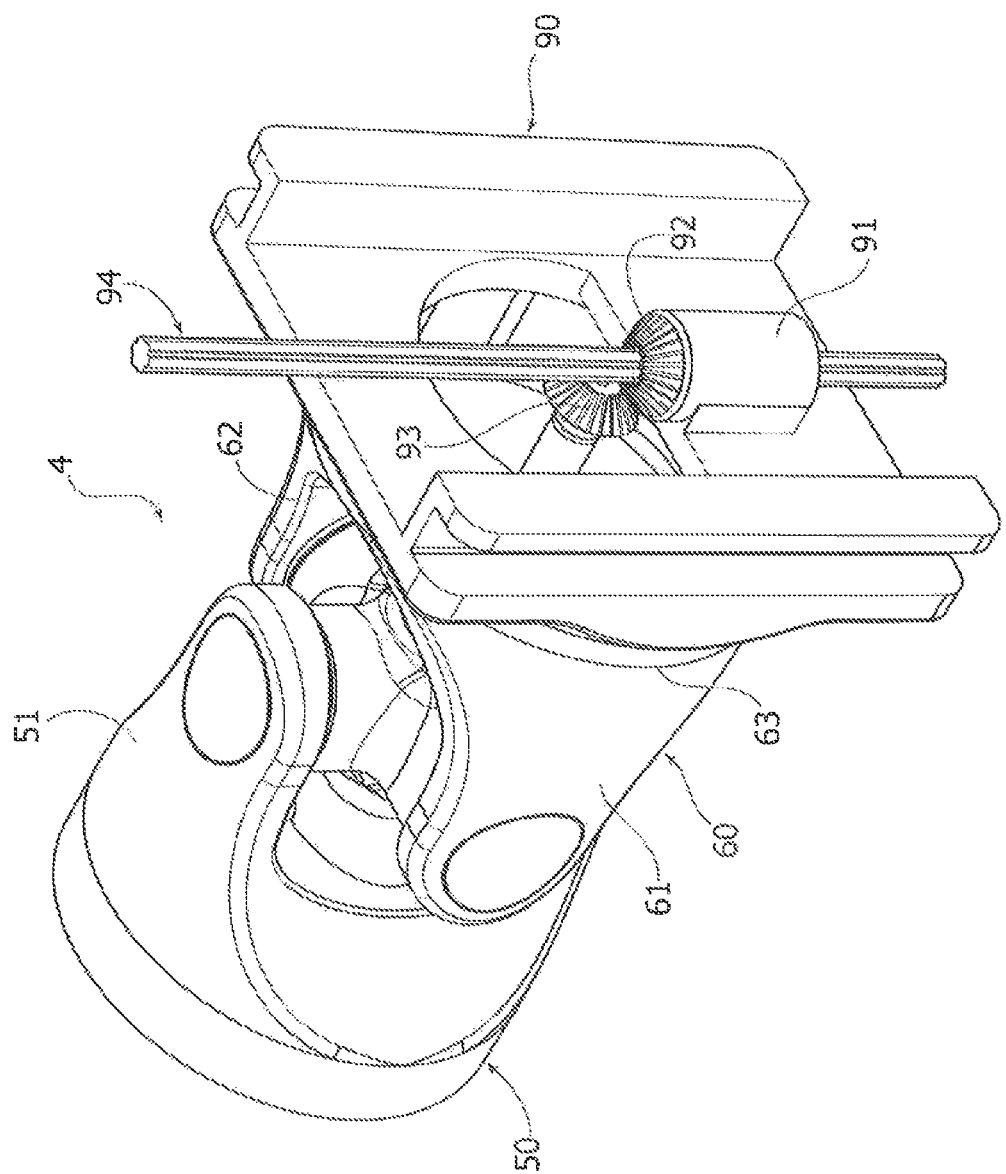
Figure 18:
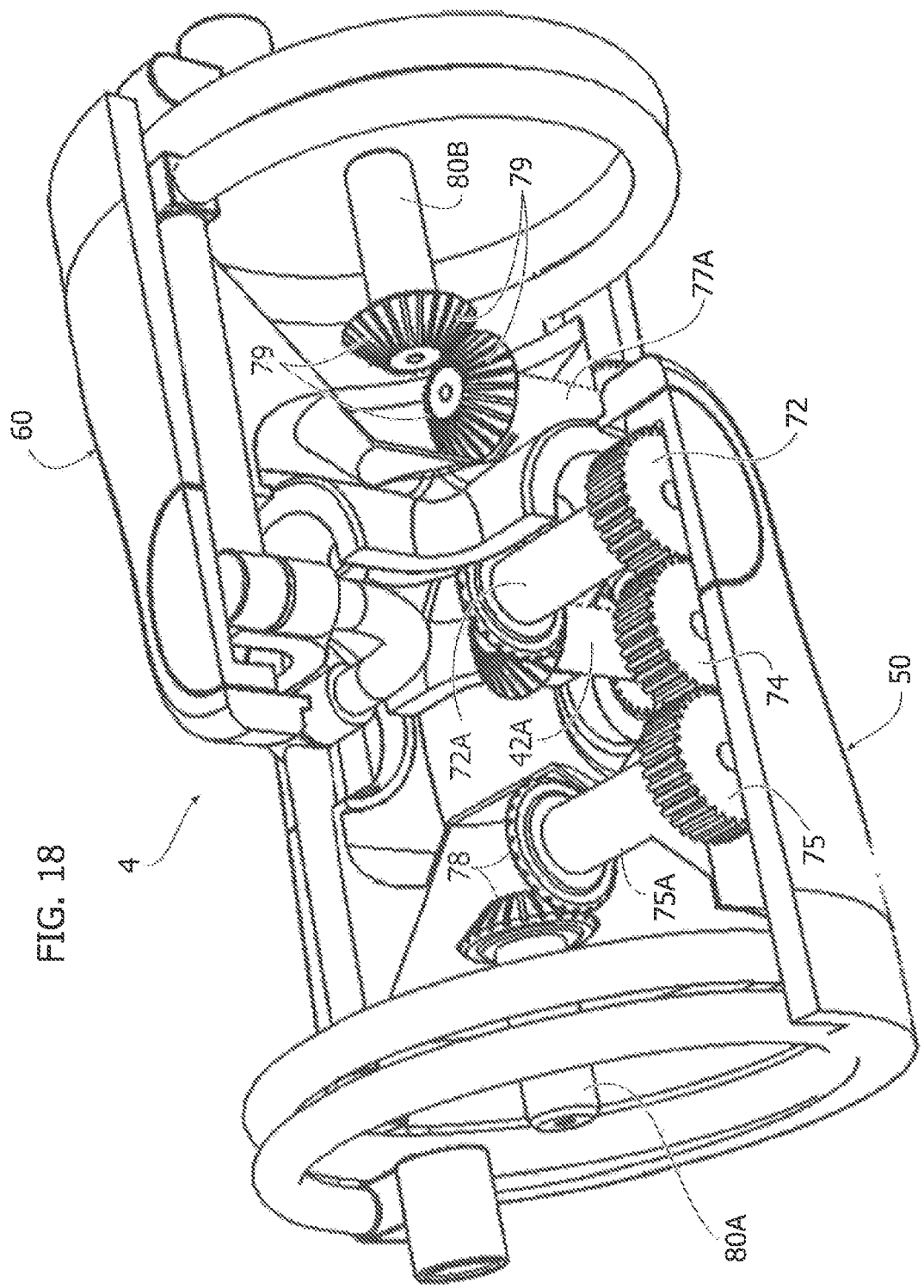
Figure 19:
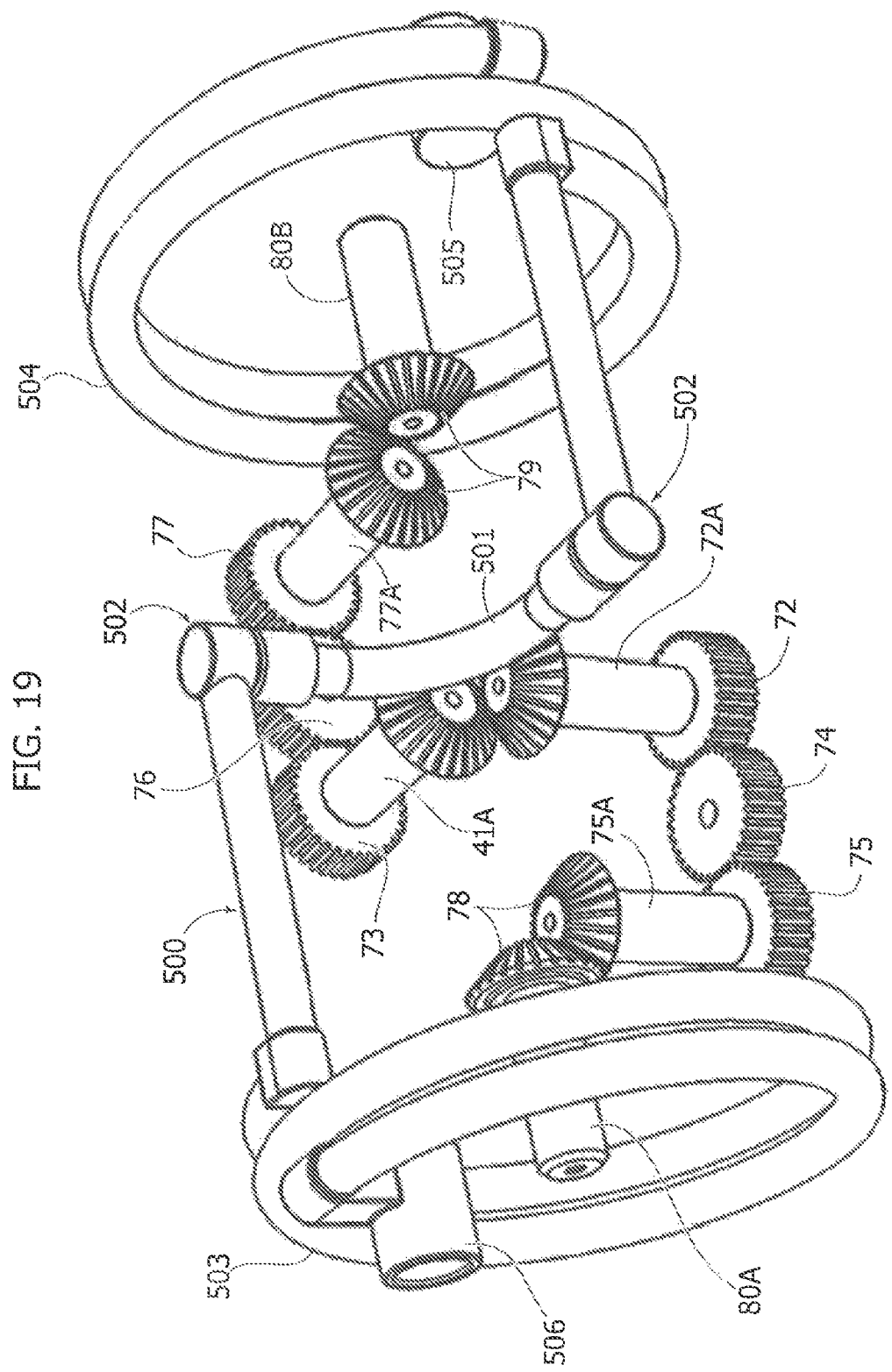

The characteristics and advantages of the invention will become apparent from the description that follows with reference to the attached drawings, provided purely by way of non-limiting example, wherein:

FIG. 1 is a perspective view of a vehicle according to a first embodiment of the present invention, FIG. 2 is a schematic plan view of the vehicle of FIG. 1, FIG. 2A illustrates an enlarged scale view of a detail of the schematic plan view of FIG. 2, according to a variant, FIG. 3 is a perspective view of a second embodiment of the vehicle according to the invention, FIG. 4 is an exploded perspective view showing the components of the leg constituting one of the articulated legs of the vehicle of FIG. 1, FIG. 5 illustrates a variant of FIG. 4 in which a hydraulic motor is provided for driving the wheel associated with the aforesaid leg, FIG. 6 is an additional exploded perspective view corresponding to that of FIG. 5, which also shows the outer casing of the leg, FIG. 7 illustrates a variant of FIG. 4, which refers to the case in which a transmission line is provided within the leg to connect a vehicle engine with the wheel carried by the leg, FIG. 7A is a partially cross-sectioned view of the assembly of FIG. 7, FIG. 8 shows a variant, in which the leg contains an electric motor for driving the vehicle wheel, FIG. 9 illustrates an additional variant of the leg of FIG. 4, in which an additional joint is provided about a vertical axis, which allows adjustment of the vehicle track width, FIG. 10 shows the same assembly of FIG. 9 in an exploded and partially cross-sectioned perspective view, FIG. 11 is an additional perspective view of the assembly of FIG. 10, FIG. 12 is a schematic plan view of the assembly of FIGS. 9-11, FIG. 13 shows a perspective view of a cardan joint used for the connection between the front module and the rear module of the vehicle of the invention, according to the embodiment of FIG. 1 or FIG. 3, FIGS. 14, 15, 16 are further perspective and partially cross-sectioned views of the cardan joint of FIG. 13, FIG. 17 illustrates a perspective view of a variant of the cardan joint forming part of the vehicle according to the invention, and FIGS. 18 and 19 are two further perspective views showing a variant of the cardan joint in which the joint is provided with a tube for feeding a fluid.

GENERAL CONFIGURATION OF THE VEHICLE

In FIG. 1, the reference number 1 indicates—in its entirety—a vehicle of the ATV type particularly suitable for use in civil protection activities or the like. The vehicle 1 comprises a front vehicle module 2 and a rear vehicle module 3, for transporting persons and/or material, reciprocally articulated by means of a cardan joint 4 (which will be described in detail below) about two mutually orthogonal axes. With reference also to FIG. 2, when the vehicle is in its neutral condition on flat ground, with the front and rear modules 2, 3 aligned with each other, one of the two articulation axes V and T of the modules 2, 3 is directed vertically (axis V in FIG. 2) and the other horizontally and transversely with respect to the longitudinal direction of the vehicle (axis T in FIG. 2).

In the present description and in the claims that follow, the term "longitudinal" is used with reference to the longitudinal direction of the vehicle and the term "transverse" is used with reference to a direction orthogonal to the longitudinal vertical plane of the vehicle.

Again with reference to the embodiment of FIGS. 1 and 2, the vehicle 1 is provided, both on the front module 2 and on the rear module 3, with a plurality of articulated legs L bearing respective wheels R, which in this embodiment are all non-steered wheels. Steering of the vehicle is in fact obtained by means of a pair of actuator devices 400, for example, two electronically-controlled electromechanical actuators, in the form of actuating cylinders, having ends respectively articulated to the front module 2 and to the rear module 3 of the vehicle. The actuating cylinders 40 are controlled by an electronic control unit E of the vehicle (FIG. 2) as a function of the rotation imparted by the driver to the steering wheel of the vehicle, to generate a desired steering of the vehicle.

In the example illustrated in FIGS. 1 and 2, each articulated leg L consists of a single articulated segment, while FIG. 2A shows a variant in which the articulated leg L comprises two mutually articulated segments L1, L2.

In both the solutions of FIGS. 2 and 2A, each articulated leg L is mounted articulated on the structure of the vehicle about a transverse axis T1, orthogonal to the longitudinal vertical plane of the vehicle.

Furthermore, in the example illustrated in FIG. 2, all the wheels R carried by the articulated legs L of the front module 2 and of the rear module 3 are drive wheels. In the example illustrated in this Figure, a single internal combustion engine (ICE) is provided, carried by the front vehicle module 2 and connected by means of respective transmission lines (only illustrated schematically in FIG. 2) to all the wheels of the vehicle. In the case illustrated here, the transmission line includes a main drive shaft A100 associated with the front module 2 of the vehicle, and a main drive shaft A200 associated with the rear module 3 of the vehicle. The main drive shafts A100, A200 are connected to each other through a transmission line passing through the cardan joint 4, as will be illustrated in greater detail below. Moreover, again with reference to this embodiment, each of the drive shafts A1, A2 is connected by means of respective differentials D1, D2, D3, D4 to transverse shafts 19, which carry the motion to a transmission passing through each of the articulated legs L and connected to the respective wheel R.

Of course, each articulated leg L can carry a wheel assembly including several wheels R, instead of a single wheel R, as shown in the example illustrated in FIG. 1.

FIG. 3 shows a variant of the vehicle 1. In this Figure, the parts common to those of FIG. 1 are indicated by the same reference numbers. The vehicle of FIG. 3 differs from that of FIG. 1 in that each articulated leg L carries a track assembly C.

Preferred Embodiment of the Articulated Leg

FIG. 4 shows an embodiment of each articulated leg L of the vehicles of FIGS. 1-3. FIG. 4 refers to a simplified solution, in which the articulated leg is constituted by a single segment and is not equipped with any type of motor or transmission line, being designed to carry a non-motorized wheel. Below, further embodiments will be illustrated in which the wheels R are, instead, motorized.

With reference to FIG. 4, the leg L has a structure in the form of a half-shell of metal material L10, designed to be closed by a cover L20 (which is only illustrated in FIG. 6, with reference to the embodiment of FIGS. 5, 6). The body L10 has a first end L10A defining a hub 7 for supporting a shaft (not illustrated) carrying the respective wheel R, and a second end L10B, which is pivotably mounted about the transverse axis T1 on a ring support S1. The ring support S1 is connected in rotation with a further ring support S2, by engagement of front teeth 8 of the ring support S1 within radial slots 9 of the ring support S2. The two ring supports S1, S2 thus form a single structure which is rotatably mounted about the axis T1 on a support 6 (which is only visible in FIG. 7A with reference to the embodiment of FIG. 7), rigidly connected to the structure of the vehicle.

The angular position of the assembly formed by the supports S1, S2 about the aforesaid transverse axis T1 is controlled by an actuator A carried by the structure 5 of the vehicle, and including a gearmotor assembly MR formed by an electric motor and a gearbox associated with it, of any known type, and a cylinder A1 with a nut (not shown in the drawings) driven by the gearmotor assembly, and a screw engaged within the nut and constituting a stem A2 of the aforesaid actuator. The stem A2 is articulated to an ear 10 of the ring support S2.

The electronic unit E of the vehicle controls each actuator A, according to a logic which will be illustrated in greater detail below, in order to determine the angular position of each articulated leg L with respect to the transverse axis T1.

Within the body L10 of the articulated leg L, two cylinder spring-shock absorber assemblies 11, 12, are provided, each having an end E1 connected in an articulated manner to the ring support S1, and an end E2 connected in an articulated manner to the body L10 of the leg L, near the wheel axis R1 defined by the hub 7.

The two spring-shock absorber assemblies 11, 12 extend along the longitudinal direction of the leg L and perform the following two functions:

during an adjustment of the angular position of the support assembly S1, S2, by activating the actuator device A, the spring-shock absorber assemblies 11, 12 cause a variation in the angular position of the entire leg L about the transverse axis T1, together with the support assembly S1, S2;

while the vehicle is moving, the shock-absorbing assemblies 11, 12 act as a suspension of the wheel assembly (or the track assembly) associated with the articulated leg, reacting to the oscillations transmitted by the ground and recalling the leg towards a neutral position corresponding to the adjustment position of the ring support S1, S2. Every oscillation of the leg about the axis T1, for a given position of the support assembly S1, S2, corresponds to an elongation of one of the two spring-shock absorber assemblies 11, 12 and to a shortening of the other assembly. The spring of each assembly 11, 12 tends to bring the leg L back to its neutral position, and the shock absorber associated therewith dampens the resulting oscillations.

In the case of an articulated leg formed by several mutually articulated segments L1, L2 (see FIG. 2A), the arrangement illustrated in FIG. 4 can theoretically be provided for each leg, but more simply, the arrangement can be provided for just the leg L1, closer to the vehicle, the position of the leg L2 with respect to the leg L1 can be controlled by an actuator of any type, for example, a hydraulic actuator, similar to the operating arm of an earth-moving machine.

FIG. 5 shows a variant in which the end L10A of the body of the articulated leg L10 carries a hydraulic motor MI for driving the wheel. FIG. 6 shows the same assembly of FIG. 5 completed with a cover L20 applied to the body L10 of the articulated leg.

FIG. 7 shows a variant of FIG. 4 in which the leg L is crossed by a transmission line that drives the motion from the main internal combustion engine ICE located on board the front module 2 of the vehicle (FIG. 2) up to the wheel, or to the wheel assembly, or to the track assembly associated with the articulated leg. As shown in FIG. 7, a drive shaft 15 is rotatably mounted inside the supporting structure L10 of the leg L by means of supports 13, 14, which is connected at its ends by means of respective bevel gear pairs 16, 17 with a shaft 18 that drives the respective wheel, wheel assembly or track assembly, and a shaft 19 rotatably mounted on the vehicle structure about the transverse axis T1, which receives the motion (see FIG. 2) by means of a differential D1 from the main drive shaft A1 of the front module 2 of the vehicle. A similar arrangement can of course be used for each of the articulated legs of the vehicle. FIG. 7A shows the cross-section of the support assembly consisting of the ring supports S1, S2, which are rigidly connected to each other and rotatably mounted on the support 6 that is rigidly connected to the vehicle structure (not shown in the Figure).

FIG. 8 shows an additional variant of the articulated leg with a motorized wheel, in which the wheel is driven by an electric motor M mounted on the articulated leg L adjacent to the axis T1, in the space between the two spring-shock absorber assemblies 11, 12. The shaft 20 of the electric motor M extends in the longitudinal direction of the leg L, in the space between the two spring-shock absorber assemblies 11, 12 and is connected to the shaft 18, which drives the wheel by a bevel gear 17.

FIGS. 9-11 and 12 refer to an additional variant of the assembly of FIG. 4 in which the leg L is also articulated about an axis V1 orthogonal to the axis T1. More precisely, the end L10B of the body L10 of the leg L is configured as a fork and is mounted articulated about the aforesaid axis V1 on an intermediate support S3 having a cylindrical body which is pivotably mounted about the transverse axis T1 on a drum S1 having the function of the support assembly S1, S2 of FIG. 4. The drum support S1 is, in turn, rotatable on a drum support 6 carried by the vehicle structure. An actuator A is arranged within the body of the support 6 and is operatively interposed between said support 6 and the support S1 for controlling the angular position of the support S1 about the axis T1. The intermediate support S3 follows the support S1 in its adjustment movement about the axis T1, when the actuator A is activated. At the same time, spring-shock absorber assemblies (not shown) are interposed between the intermediate support S3 and the support S1, which are functionally similar to the assemblies 11, 12, to transmit the adjustment movement imparted by the actuator A to the intermediate support S3 and, at the same time, to act as a suspension system of the leg L, configured to recall the leg L towards the neutral position while the vehicle is moving on the ground. Also in the case of the embodiment of FIGS. 9-12, the wheel R is motorized by means of an electric motor M carried by the structure of the leg L and connected by two bevel gear pairs 17, 21 with the wheel shaft 18.

The angular position of the leg L with respect to the axis V1 is controlled by an actuator, for example, an electric motor (not illustrated) carried by the support S3 and connected by means of a bevel gear pair (not illustrated) to a shaft V11 arranged on the axis V1 and rigidly connected to the body of the leg. By means of this actuator, it is possible to modify the position along the transverse direction of the wheel R, so as to vary the vehicle track width (see FIG. 12).

The embodiment of FIGS. 9-12 can envisage that the wheel carried by the articulated leg L is a steerable wheel, in this case, the end L10A of the leg L carries a wheel-carrier support ST (see FIG. 12) incorporating an electric motor for actuating the steering of the wheel R. The leg L is shaped so as not to interfere with the wheel R in its steering movements.

Controlling the Vehicle Attitude

In all the embodiments of the vehicle according to the invention, the articulated legs of the vehicle serve both the suspension function of the vehicle and the function of allowing self-levelling of the vehicle while traveling on uneven terrain. With reference to FIG. 2, at least some of the articulated legs of the vehicle and/or some of the wheel assemblies or track assemblies carried by these articulated legs, are associated with sensor devices 100 produced with any known technology (for example, "lidar", radar or ultrasound laser detectors), which are able to map the ground in front of the vehicle according to a virtual path, for example, twice the width of the wheel assembly or track assembly and of a maximum length, for example, not exceeding 30 m. Said map, of three-dimensional configuration, is characterized by an altimetric profile of the longitudinal section and by an altimetric profile of the cross-section. Examples of sensor devices that can be used are the "TacFlir 280-HD" device produced by the company FLIR Systems, Inc., or the "Velodyne LiDAR" device produced by the company Velodyne LiDAR, Inc.

With reference to FIG. 2, the signals coming from the sensors 100 are sent to the electronic control unit E of which the vehicle is equipped, which consequently controls the actuators A (see FIG. 4) associated with each articulated leg. The electronic control unit E is configured to control the actuators A associated with the articulated legs of the vehicle, both according to the signals coming from the sensors 100 that define the contour of the terrain in front of the vehicle, and according to the advancing speed of the vehicle itself. The electronic control unit E is thus able to control the actuators A so that the articulated legs of the vehicle are arranged in an attitude that depends, according to a predetermined logic, on the contour of the terrain. For example, the articulated legs can be controlled so as to keep the vehicle cabin substantially at a constant level and with a stable horizontal attitude while the vehicle moves along the ground. Preferably, the electronic control system comprises an inertial platform that records the acceleration values along three mutually orthogonal axes and the rotations about said axes, and includes a control system programmed to preserve (or at least perturb to the minimum extent) the horizontal attitude of the entire body of the vehicle. The control system operates by comparing the output signals from the sensor system 100 with the movement limits of the articulated legs carrying the wheel assemblies or track assemblies of the vehicle. If, for example, the system detects that the compensation of the attitude is impossible as the stroke bottom of one of the articulated legs of the vehicle has been reached, the motion of the vehicle is instructed to stop, or slow down, up to a minimum value allowed.

As shown, therefore, the vehicle control system is able to operate according to a predictive logic that allows the vehicle suspension system to operate non-passively following the received stresses, but actively, thanks to a prediction of future stresses.

It should also be noted that the maximum speed that can be reached by the vehicle with respect to the ground, in a control mode of the type indicated above, is limited by the need to allow the sensors 100 to detect the contour of the ground in front of the vehicle. The distance of 30 m indicated above for the range of action of the sensors 100 is not arbitrary. If it is hypothesized that the reaction time of the movement system of the single wheel is in the order of 1 second, with a sampling time of the sensors 100 of 0.001 seconds, then the maximum speed that can be reached by the vehicle is 108 Km/h (30×3600). This speed is fully adequate for all-terrain vehicles of the type forming the subject of the present invention.

Cardan Joint

FIGS. 13-16 illustrate a preferred embodiment of the cardan joint 4 which connects the two vehicle modules 2, 3 in the embodiments of FIGS. 1 and 3. Although this cardan joint is described herein with reference to the embodiments of the vehicle illustrated herein, this cardan joint is of general application and can therefore form, on its own, a separate invention from that claimed herein, also applicable in fields other than vehicles.

In the embodiments illustrated herein, the vehicle comprises a single internal combustion engine ICE arranged on the front module 2 of the vehicle, which controls both the wheel assemblies or the track assemblies of the front module 2, and the wheel assemblies or track assemblies of the rear module 3. The motion to the wheel assemblies or track assemblies of the rear module 3 is transmitted by means of a transmission line passing through the cardan joint 4.

With reference to FIGS. 13-16, the cardan joint 4 comprises a cross member 40 having a hollow body defining four cross-shaped tubular branches, of which the upper vertical branch 41 and the two lateral branches 42, 43 are visible in the drawings. The lower vertical branch is not visible in the drawings, but has an identical and symmetrical configuration with respect to that of the upper vertical branch 41.

The cardan joint 4 also comprises a first fork member 50 and a second fork member 60 each having a hollow body defining pairs of branches 51, 52 and 61, 62, which are mounted articulated on the opposite ends of the upper vertical branch 41 and the lower vertical branch of the cross member 40 and on the opposite ends of the two lateral branches 42, 43 of the cross member 40, respectively. On the opposite side, the two fork members 50, 60 have base structures 53, 63, which are rigidly connected to the structure of the respective vehicle modules 2, 3. Alternatively, each of the structures 53, 63 can be rotatably connected to the structure of the respective vehicle module about a longitudinal axis and/or slidingly in a vertical direction. The latter solution will be described in detail below with reference to FIG. 17.

Figure 14:
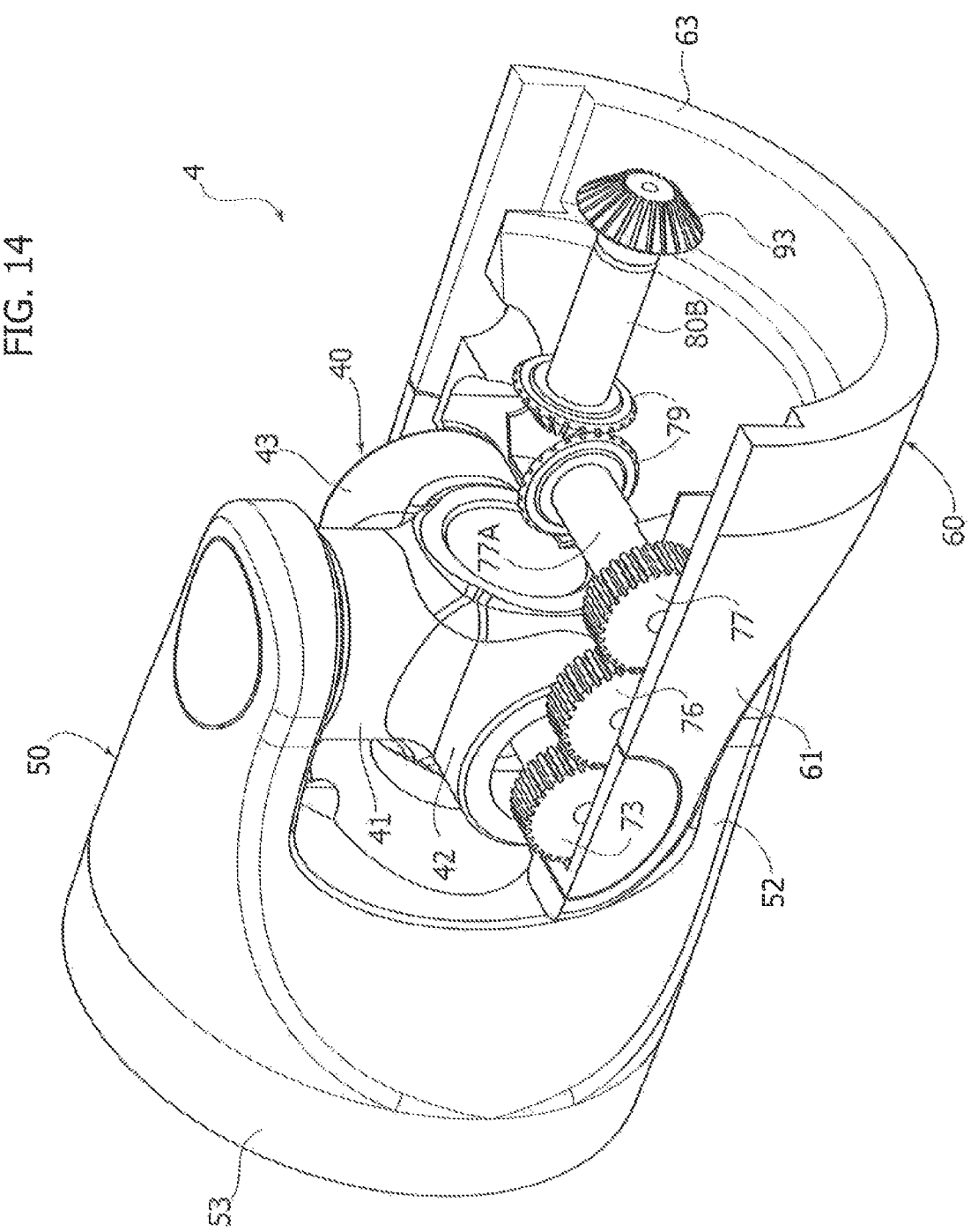

As shown in the cross-sectional view of FIGS. 14-16 and, in particular, in the cross-sectional view of FIG. 16, the upper vertical branch 41 and the side branch 42 of the cross member 40 rotate two respective shafts 41A, 42A within them, connected to each other at the center of the cross member 40 by means of a bevel gear pair 71. The two shafts 41A, 42A have ends protruding from respective branches 41, 42 of the cross member 4 carrying respective gears 72, 73. The two gears 72, 73 engage with a train of two additional gears 74, 75 and 76, 77, which are rotatably mounted in the branch 51 of the fork member 50 and in the branch 61 of the fork member 60, respectively. The gears 75, 77 are carried by respective shafts 75A, 77A rotatably mounted within the two fork members 50, 60. These shafts 75A, 77A are connected by bevel gear pairs 78, 79 with two longitudinal shafts 80A, 80B designed to be connected with the two main drive shafts A1, A2 (FIG. 2) of the front and rear modules 2, 3 of the vehicle 1.

FIG. 17 refers to a variant in which at least one of the two fork members of the cardan joint 4 (in this case the fork member 60) has its base structure 63 rigidly connected to a slide 90, which is mounted vertically slidable on the structure of the respective vehicle module. In this way, the entire cardan joint 4, with its cross member 40 and the two fork members 50, 60 can move vertically together with the vehicle module located on the opposite side (the one farthest from the observer in FIG. 19) with respect to the vehicle module on which the slide 90 is vertically slidable.

As shown in FIG. 17, the slide 90 incorporates a cylinder structure 91 within which a bevel gear 92, engaging with an additional bevel gear 93 and which is connected in rotation with the shaft 80B protruding from the cardan joint, is rotatably supported about a vertical axis. The body of the gear 92 is slidably mounted, by means of a splined coupling, on a vertical drive shaft 94, which is carried by the structure of the vehicle module on which the slide 90 is mounted. The drive shaft 94 is designed to be connected, by means of a bevel gear pair (not illustrated) with the main drive shaft of the vehicle module.

In the solution of FIG. 19, when the two vehicle modules move relative to each other in the vertical direction at the cardan joint 4, one of the two modules moves together with the entire cardan joint 4 and the slide 90 compared to the other module. During this vertical movement, the gear 92 slides above the vertical drive shaft 94, while the motion is transmitted through the shaft 80B, the bevel gear 92, 93 and the drive shaft 94, to the main drive shaft of the vehicle module on which the slide 90 is slidably mounted.

Of course, nothing excludes the possibility of also providing an arrangement with a slide of the type illustrated in FIG. 19 at the opposite end of the cardan joint 4.

FIGS. 18, 19 are two additional partial perspective views that show a variant of the joint 4 in which the joint is crossed by a tube 500 for feeding a fluid (for example oil), coming from a source of pressurized fluid associated with the front module of the vehicle and designed to feed various hydraulic services (for example, hydraulic motors and hydraulic actuators) provided on the rear module of the vehicle. The tube 500 has an intermediate segment 501 folded by 90° having its opposite ends connected, by means of rotatable hydraulic joints 502, to the adjacent portions of the tube 500. At the two ends of the joint 4, the tube 500 terminates with two circular spiral portions 503, 504, configured to deform elastically during the movements of the joint 4, and connected to two end fittings 505, 506. The tube 500 can also be used as a tubular guide sheath for passing cables, or it can be replaced by two or more fluid supply tubes.

Of course, without prejudice to the principle of the invention, the details of construction and the embodiments may vary widely with respect to those described and illustrated purely by way of example, without departing from the scope of the present invention.

The invention claimed is:

1. A vehicle, comprising:
a vehicle structure, comprising at least one module for transporting persons and/or material,
a plurality of legs articulated to the vehicle structure and bearing respective wheel assemblies or track assemblies,
wherein each leg of the vehicle is pivotably mounted with respect to the structure of the vehicle at least about a first transverse axis,
each articulated leg having a first end bearing said wheel assembly or said track assembly and a second end freely mounted pivoting about said first transverse axis on a first support that is carried, directly or indirectly, by the vehicle structure, in such a way that said first support is adjustable in an angular position about said first transverse axis,
an electronically-controlled actuator associated with said leg of the vehicle, for adjusting the angular position of said first support about said first transverse axis,
two spring-shock absorber assemblies interposed between said first support on which the second end of the leg is pivotably mounted and the leg, said two spring-shock absorber assemblies extending along the leg on either side of a plane passing through said first transverse axis and a transverse axis defining the main axis of the wheel assembly or of the track assembly, in such a way that said spring-shock absorber assemblies perform the following two functions:
during an adjustment of the angular position of said first support of the second end of the leg, said spring-shock absorber assemblies cause a variation in the angular position of the entire leg about said first transverse axis in conjunction with said first support,
while the vehicle is moving, said spring-shock absorber assemblies act as a suspension of the wheel assembly or of the track assembly reacting to the oscillations transmitted to the leg from the ground and recalling said leg towards a neutral position corresponding to the adjustment position of said first support.

2. A vehicle according to claim 1, wherein at least some of said articulated legs carry said wheel assembly or said track assembly that is motorized.

3. A vehicle according to claim 2, wherein at least some of said legs carry said assembly or said track assembly driven by a hydraulic motor mounted on said first end of said leg.

4. A vehicle according to claim 2, wherein at least some of said legs carry said wheel assembly or said track assembly driven by an electric motor mounted on said leg, said electric motor having a drive shaft arranged along the longitudinal direction of the leg, which actuates a driven shaft protruding from the first end of the leg, by means of a pair of bevel gears, and serving for actuating said wheel assembly or track assembly.

5. A vehicle according to claim 2, further comprising a main internal combustion engine (ICE) carried by the vehicle structure and having a drive shaft connected by means of a plurality of transmission lines to said wheel assemblies or track assemblies, wherein said leg includes a drive shaft having opposite ends connected by means of respective bevel gear pairs with a driving shaft driven by the main engine and with a driven shaft that drives the wheel assembly or the track assembly.

6. A vehicle according to claim 1, further comprising a front module and a rear module for transporting persons and/or material, mutually articulated about two axes that intersect orthogonally with each other, said modules each being provided with said articulated legs bearing said wheel assemblies or track assemblies, wherein said wheel assemblies or track assemblies are not steering, and two steering actuators located in the proximity of the reciprocal articulation of the two vehicle modules, said two steering actuators controlling the relative inclination of said modules about at least one articulation axis.

7. A vehicle according to claim 1, wherein at least some legs of the vehicle have the second end mounted articulated about a substantially vertical axis above an intermediate support, which is, in turn, pivotably mounted on said first support about said transverse axis, said spring-shock absorber assemblies being interposed between said intermediate support and said first support.

8. A vehicle according to claim 7, wherein the angular position of each said leg about the aforesaid vertical articulation axis at the intermediate support is controlled by an actuator.

9. A vehicle according to claim 6, wherein the front module and the rear module are both provided with articulated legs bearing wheel assemblies or track assemblies, which are motorized, in that the vehicle comprises a single internal combustion engine (ICE) carried by the front module, and in that the front module and the rear module are mutually articulated about said two mutually orthogonal axes by means of a cardan joint, comprising a cross member and two fork members articulated to respective branches of the cross member and in that the wheel assemblies or the track assemblies of the rear module that are motorized are driven by the engine (ICE) of the front module by means of a transmission line passing through the cardan joint.

10. A vehicle according to claim 9, wherein the cross member of the cardan joint has a hollow body, in that two shafts are rotatably mounted within two orthogonal branches of the hollow body of the cross member said shafts being connected to each other at the center of the cross member by means of a bevel gear pair, in that said two shafts have ends protruding from the respective branches of the cross member, which are each connected to a respective train of gears rotatably mounted in respective branches of the two fork members and in that said gears are connected by means of two respective bevel gears with longitudinal drive shafts associated, respectively, with the two fork members.

11. A vehicle according to claim 10, wherein at least one of the two fork members is connected to the respective vehicle module in a rotatable manner about a longitudinal axis.

12. A vehicle according to claim 11, wherein at least one of the two fork members is rigidly connected to a slide mounted vertically slidable on the vehicle module located on the side of said fork member and in that the longitudinal drive shaft of this fork member carries a bevel gear engaging with a bevel gear with a vertical axis that is rotatably mounted on said slide and which is slidably mounted by means of a splined coupling on a vertical drive shaft rotatably mounted on said vehicle module on which said slide is mounted.

13. A vehicle according to claim 1, further comprising a sensor system associated with at least some of said articulated legs configured for detecting the terrain contour in front of the vehicle while the vehicle is moving, said vehicle being equipped with an electronic control unit configured to receive output signals from said sensor devices and to control the actuator devices that control the attitude of the articulated legs of the vehicle according to said output signals and according to one or more operating parameters, including at least the speed of movement of the vehicle with respect to the ground.

\* \* \* \* \*